Figure 1:
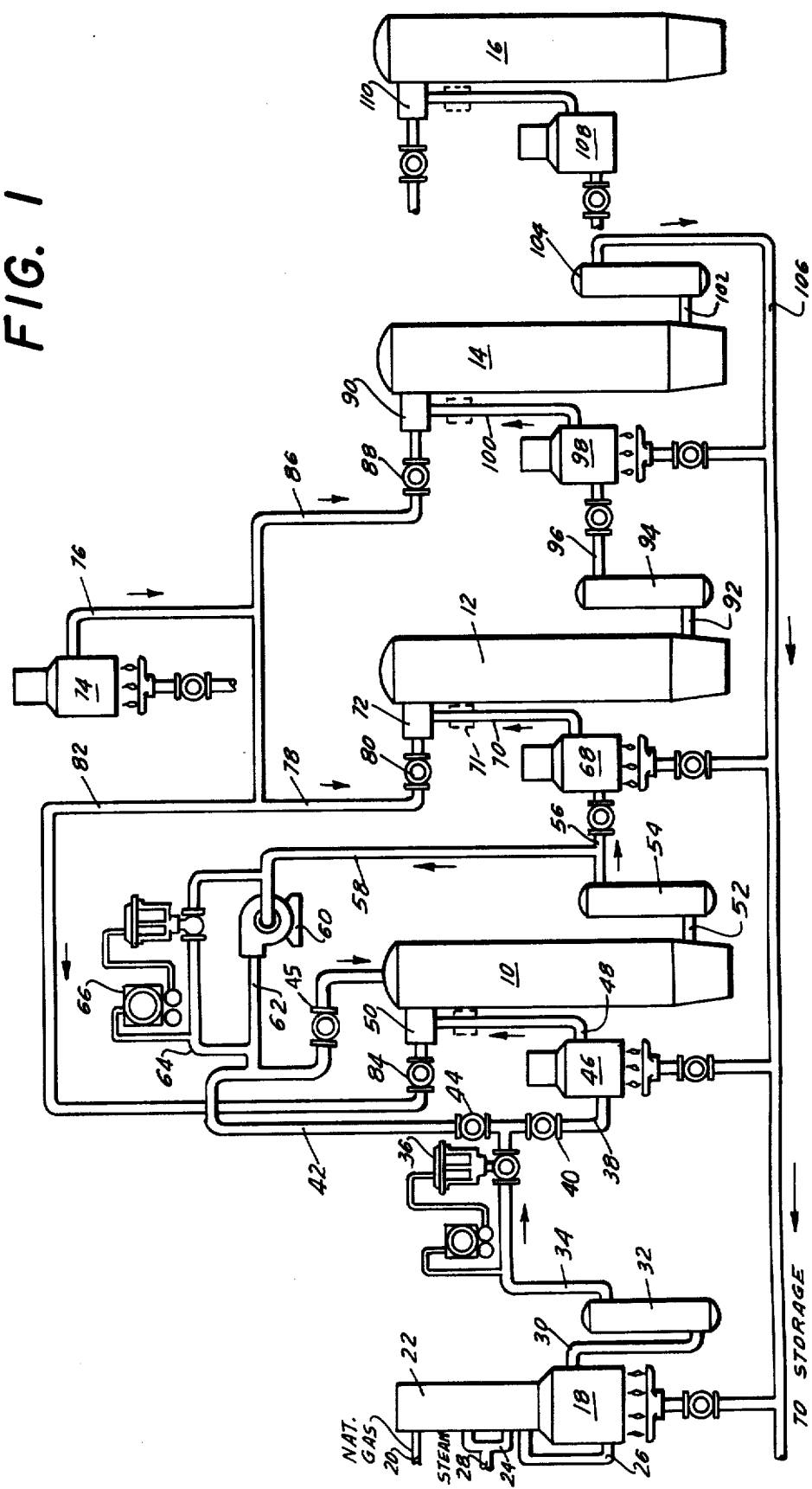

United States Patent [19]

Celada et al.

[11] 4,046,556
[45] Sept. 6, 1977

[54] DIRECT GASEOUS REDUCTION OF OXIDIC METAL ORES WITH DUAL TEMPERATURE COOLING OF THE REDUCED PRODUCT

[75] Inventors: Juan Celada; Patrick W. MacKay, both of Monterrey, Mexico

[73] Assignee: Fierro Esponja, S.A., Monterrey, Mexico

[21] Appl. No.: 646,379

[22] Filed: Jan. 2, 1976

[51] Int. Cl.$^2$ .............................................. C21B 13/02
[52] U.S. Cl. .................................................. 75/35; 75/91
[58] Field of Search ............... 75/34, 35, 31, 29, 91, 75/.5 R

[56] References Cited

U.S. PATENT DOCUMENTS

| 2,481,217 | 9/1949 | Hemminger | 75/34 |
| 2,900,247 | 8/1959 | Celada | 75/35 |
| 3,136,624 | 6/1964 | Mader et al. | 75/34 |
| 3,423,201 | 1/1969 | Celada et al. | 75/35 |
| 3,637,368 | 1/1971 | Bessant | 75/34 |
| 3,788,835 | 1/1974 | Lewis et al. | 75/34 |
| 3,890,142 | 6/1975 | Celada et al. | 75/91 |
| 3,904,397 | 9/1975 | Celada et al. | 75/35 |

FOREIGN PATENT DOCUMENTS

| 508,951 | 1/1955 | Canada | 75/34 |
| 625,289 | 8/1961 | Canada | 75/34 |

Primary Examiner—L. Dewayne Rutledge
Assistant Examiner—Michael L. Lewis
Attorney, Agent, or Firm—Curtis, Morris & Safford

[57] ABSTRACT

A process for the direct gaseous reduction of iron ore to sponge iron wherein the sponge iron is cooled with a carbon-containing cooling gas by a dual temperature procedure that increases transfer of carbon from the cooling gas to the sponge iron and thereby permits the production of a product having a combination of relatively low or moderate metallization and relatively high potential metallization. Increased productivity of the direct reduction plant and of the overall integrated steel plant are achieved.

11 Claims, 4 Drawing Figures

DIRECT GASEOUS REDUCTION OF OXIDIC METAL ORES WITH DUAL TEMPERATURE COOLING OF THE REDUCED PRODUCT

This invention relates to the gaseous reduction of metal oxides to elemental metals at elevated temperatures, and more particularly, to an improved dual temperature method of cooling the reduced metal in order to obtain a desired relatively high "potential" metallization in combination with a relatively low metallization. The invention is especially useful in connection with the direct gaseous reduction of iron oxide ores in particulate form to sponge iron and will be illustratively described in connection with this use, although as the description proceeds, it will become apparent that the invention can be equally well used in processes wherein metal oxides other than iron oxides are reduced, e.g., oxides of metals such as copper, nickel and tin.

In one of its aspects the present invention comprises an improvement in a known batchwise process for producing sponge iron, which process is of the general type disclosed, for example, in U.S. Pat. Nos. 2,900,247; 3,423,201; 3,890,142; and 3,904,397. In such a process a multiple unit reactor system is used in which separate bodies of ferrous material are simultaneously treated. The principal operations carried out in the reactor system are (1) charging and unloading of the reactors, (2) reduction and (3) cooling of the reduced ore. For convenience these three operations are characterized herein as the production stage, the reduction stage and the cooling stage. In the particular system illustratively described below, two reduction stages are used and hence four reactors are employed to carry out the three principal operations. The reactors are so connected that during a given cycle of operations reducing gas from a suitable source, commonly a mixture largely composed of carbon monoxide and hydrogen formed in any suitable manner such as, e.g., from a mixture of steam and hydrocarbon in a catalytic reformer, flows successively through a reactor that is at the cooling stage, a reactor that is at the second reducing stage and a reactor that is at the first reducing stage. The fourth reactor is disconnected from the system for unloading and reloading.

The system is provided with suitable switching valves whereby at the end of each cycle the gas flow can be shifted to cause the cooling stage reactor to become the production stage reactor, the second reducing stage reactor to become the cooling stage reactor, the first reducing stage reactor to become the second reducing stage reactor, and the production stage reactor to become the first reducing stage reactor. Thus during a set of four cycles each reactor operates successively at each of the four stages of the operation. In order to simplify the showing in the accompanying drawings and the description, the switching connections, which are well known in the art, have been omitted, and the operation of the system is described in reference to a particular cycle.

Sponge iron produced by a process of the type disclosed in the above-identified U.S. patents is commonly used as a source of iron units for the manufacture of steel in an electric arc furnace. Such sponge iron normally contains a certain proportion of iron oxide, e.g., 10 to 20% by weight, since it is uneconomic to attempt to achieve 100% metallization of the ore. As the degree of reduction of the iron-bearing material approaches 100% metallization, it becomes increasingly difficult and time-consuming and requires an excessive amount of reducing gas to remove the remaining oxygen from the material. While the reduction reaction rate can be increased to some extent by increasing the temperature, such a temperature increase is limited by the fact that the operating temperature must be kept below the sintering temperature if the sponge iron is to remain readily removably from the reactor.

This temperature limitation does not apply to the electric furnace wherein the iron-bearing material is handled in molten form. Thus it is theoretically possible to charge the electric furnace with sponge iron of say 85% metallization and add a sufficient amount of elemental carbon to the furnace charge to react with the oxygen remaining in the iron ore. However, it is difficult to effect an intimate contact between elemental carbon and the sponge iron particles in the electric furnace, especially since the carbon has a much lower density than the iron and tends to become segregated therefrom.

As disclosed, for example, in U.S. Pat. No. 3,423,201, the cooling reactor of a gaseous reduction system can be so operated as to cause carbon to be deposited on the surface of the sponge iron particles being cooled. Such carbon deposition can be achieved by using a carbon-containing cooling gas, which within the temperature range of say 400° to 700° C. is cracked to deposit carbon that diffuses into the particles and reacts with the iron to form iron carbide that is largely concentrated in the outer portions of the sponge iron particles. The resulting sponge iron containing iron carbide has a reduced melting point that facilitates melting thereof in the steel-making process. Also the carbon in the form of iron carbide is considerably more reactive than bulk carbon and is a more effective reducing agent for the residual oxygen of the sponge iron in the electric furnace. Moreover, the reduction reaction produces carbon monoxide that bubbles up through the melt and produces a desirable agitation thereof. A still further advantage of using sponge iron containing iron carbide is that the reaction of iron carbide with residual FeO in the sponge iron consumes less heat than the reaction between elemental carbon and FeO.

While such carbon deposition is useful in enabling the electric furnace with its relatively high operating temperature to remove additional oxygen from the sponge iron, the amount of carbon deposition that can be effected in the cooling reactor of the prior art systems is quite limited. For example, using a cooling process of the type disclosed in U.S. Pat. No. 3,423,201, it is possible to introduce into the reduced metal up to about 2% by weight of carbon. As will be more fully explained hereafter, each percent of carbon is capable of autothermally increasing the percentage metallization of the sponge iron in the electric furnace by approximately 5%. Hence 2% of deposited carbon is capable of increasing the percentage of metal in the sponge iron by only about 10%.

The term "metallization" as used herein means the sum of the elemental iron and the associated with the carbon as iron carbide expressed as a weight percentage of the total iron in the sponge. Thus a sponge iron of 85% metallization and containing 2% carbon will achieve a metallization of approximately 95% in a steel-making furnace. This relationship can be conveniently characterized by the term potential metallization, i.e., a sponge iron having an 85% metallization and containing 2% of carbon can be said to have a potential metallization of approximately 95%.

Since the prior art processes for carburizing sponge iron in the cooling reactor produce a carbon deposition of up to about 2% by weight, they permit the operator to some extent to take advantage of the higher reduction potential of the electric furnace. However, since no more than about 2% of carbon can be deposited in these prior processes, the extent to which the reduction capability of the electric furnace can be used is rather limited.

It is accordingly an object of the present invention to provide a process for the gaseous reduction of iron ore to produce sponge iron and the utilization of the sponge iron in steel-making characterized by the fact that the production cost of the sponge iron units to be converted into steel is relatively low. It is another object of the invention to provide a process for making sponge iron which permits a greater proportion of the reduction process to be carried out in the economically advantageous high temperature environment of the steel-making furnace. It is still another object of the invention to provide a process for producing sponge iron having a metallization of 60 to 85% and a potential metallization of 85 to 100%. It is a still further object of the invention to provide a process for cooling sponge iron produced by the direct gaseous reduction of iron ore in such a manner as to transfer from the gas to the sponge iron a substantially greater amount of carbon than has heretofore been possible. It is a still further object of the invention to produce a sponge iron having a relatively high chemically combined carbon content of, e.g., 2.5 to 6% by weight. Other objects of the invention will be in part obvious and in part pointed out hereafter.

In order to explain further the relationship between the terms metallization and "potential metallization" as used above, let it be assumed that:

M = weight % metallization
$(Fe)_t$ = weight % total Fe in the sponge iron
$(Fe)_o$ = weight % of Fe present as FeO in the sponge iron
C = Weight % of carbon required to reduce the oxide iron $(Fe)_o$
$P_m$ = weight % of potential metallization The relationship between metallization, total iron and oxide iron can then be written as follows:

$$M = \frac{(Fe)_t - (Fe)_o}{(Fe)_t} \times 100 \tag{1}$$

The reaction in the electric furnace whereby iron oxide in the sponge iron is reduced with carbon may be expressed by the following equation:

$$FeO + C \rightarrow Fe + CO \tag{2}$$

Since a gram atom of carbon produces a gram atom of elemental iron:

$$\frac{C}{12} = \frac{(Fe)_o}{56} \tag{3}$$

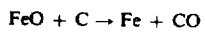

$$(Fe)_o = 4.67C \tag{4}$$

Substituting the value of $(Fe)_o$ of equation (4) in equation (1) gives:

$$M = \frac{(Fe)_t - 4.67C}{(Fe)_t} \times 100 \tag{5}$$

simplifying:

$$M = \left[1 - \frac{4.67C}{(Fe)_t}\right] \times 100 \tag{6}$$

The rate of change of M with respect to C can be determined by taking the derivative of M with respect to C as follows:

$$\frac{dM}{dC} = -\frac{467}{(Fe)_t} \tag{7}$$

or in differential form:

$$dM = -\frac{467}{(Fe)_t} dC \tag{8}$$

Thus, for each differential amount of carbon, $dC$, that is consumed according to equation (2), there is a reduction effect that is equivalent to a differential amount of metallization, $dM$, as given by equation (8). In incremental form $$\Delta M = -\frac{467}{(Fe)_t} \Delta C \tag{8A}$$

or taking $\Delta C$ equal to minus the carbon content of the sponge, $$\Delta C = -C \tag{8B}$$

$$\Delta M = \frac{467C}{(Fe)_t} \tag{8C}$$

The potential metallization is the ordinary metallization plus the metallization equivalent of the carbon in the sponge iron and may be expressed as follows:

$$P_m = M + \Delta M \tag{9A}$$

$$P_m = M + \frac{467C}{(Fe)_t} \tag{9B}$$

A typical analysis for sponge iron made by a process such as that disclosed in U.S. Pat. No. 3,423,201 is as follows:

| | | |
|---|---|---|
| Fe present as metallic iron | 43.315% | |
| Fe present as $Fe_3C$ | 31.400% | |
| Total non-oxide iron | 74.715% | |
| Fe as oxide $(Fe)_o$ | 13.185% | |
| Total Fe $(Fe)_t$ | | 87.90% |
| Oxygen in FeO | | 3.9% |
| Carbon present as $Fe_3C$ | 2.1% | |
| Free Carbon | 0.1% | |
| Total Carbon (C) | | 2.2% |
| Gangue | | 6.0% |
| | | 100.0% |

For a sponge iron having the analysis given above:

| | |
|---|---|
| The metallization $M$ from equation (1) is | 85% |
| The metallization equivalent of the carbon is 5.32C | 11.7% |
| The potential metallization $P_m$ from equation (9) is | 96.7% |

As indicated above, it has been found that a considerable part of the reduction process can be advantageously accomplished in the electric furnace without detrimentally affecting the furnace operation while enhancing the overall economics of producing steel from iron ore. The principal reactions involved may be represented as follows:

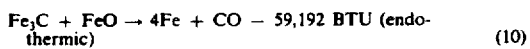

$$Fe_3C + FeO \rightarrow 4Fe + CO - 59{,}192 \text{ BTU (endothermic)} \qquad (10)$$

$$CO + \tfrac{1}{2} O_2 \rightarrow CO_2 + 121{,}744 \text{ BTU (exothermic)} \qquad (11)$$

It will be noted from the foregoing equations that while the reduction reaction is endothermic, it produces carbon monoxide which is oxidized to carbon dioxide by a strongly exothermic reaction. Thus the reduction of the FeO in the sponge iron by the carbon therein does not increase the thermal load of the electric furnace. In general it has been found that overall economies are achieved by so operating the gaseous reduction plant as to produce sponge iron having a metallization of 60 to 85%, preferably 70 to 80% and advantageously completing the reduction in the electric furnace by effectively utilizing the inherent high temperature reduction capability of the furnace.

From the foregoing description it will be apparent that if the gaseous reduction plant produces a sponge iron having a metallization of no more than 70 to 80% and the remainder of the reduction is to be effected in the electric furnace using the carbon content of the sponge iron as a reducing agent, the carbon content of the sponge iron leaving the gaseous reduction plant must be of the order of 2.5 to 6% by weight. Such a high carbon content cannot be attained with the prior art processes. In accordance with the present invention a novel dual temperature cooling procedure is used to achieve a relatively high carbon sponge iron.

Figure 2:
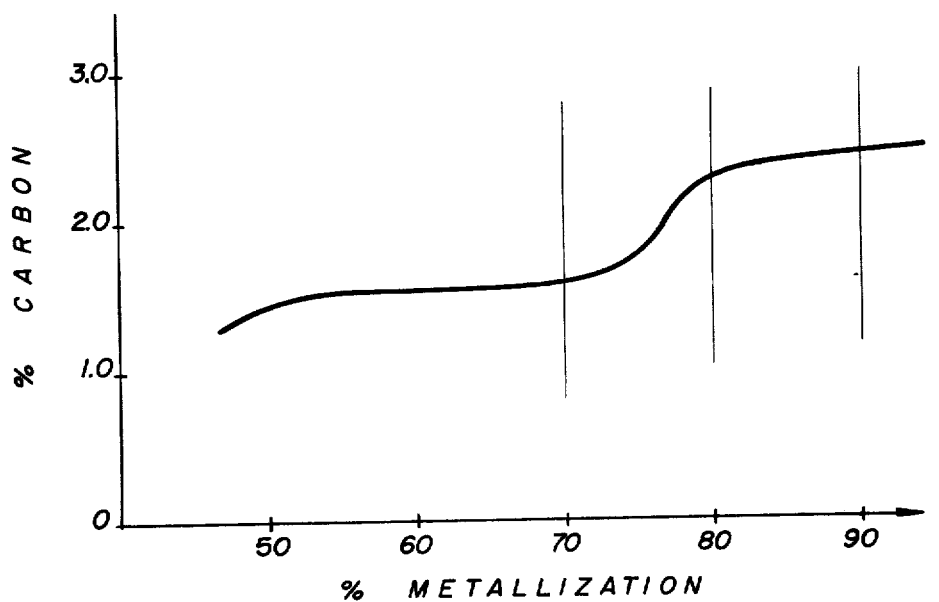
Figure 3:
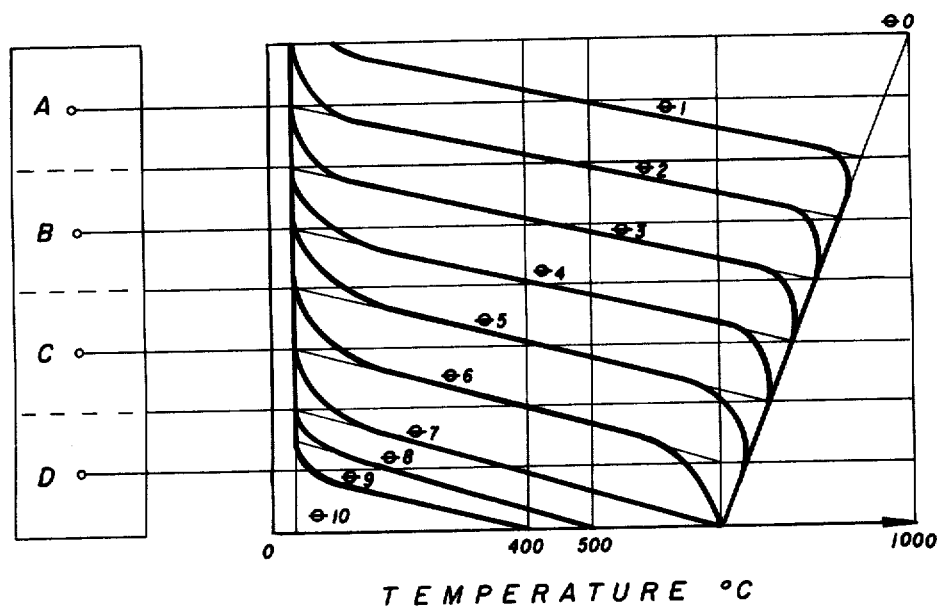
Figure 4:
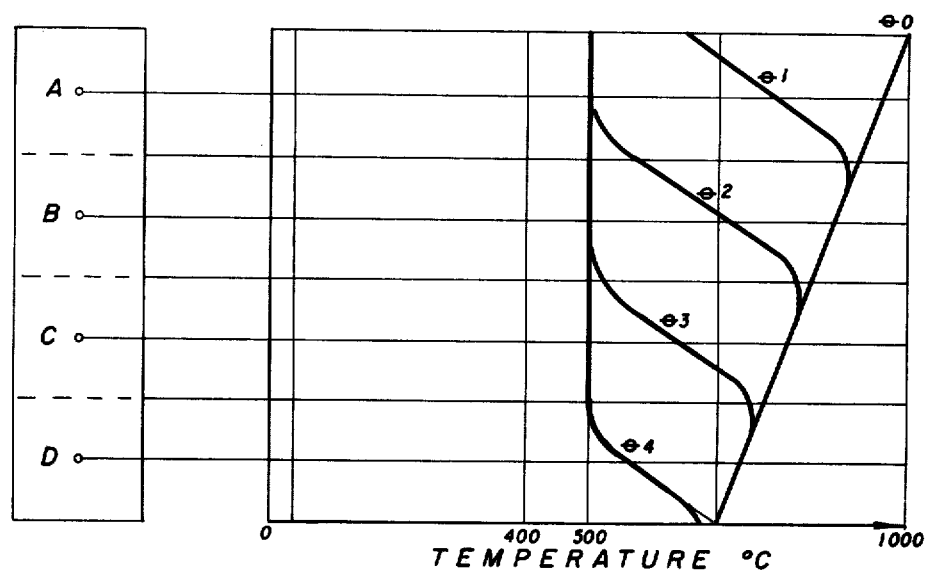
Figure 4:
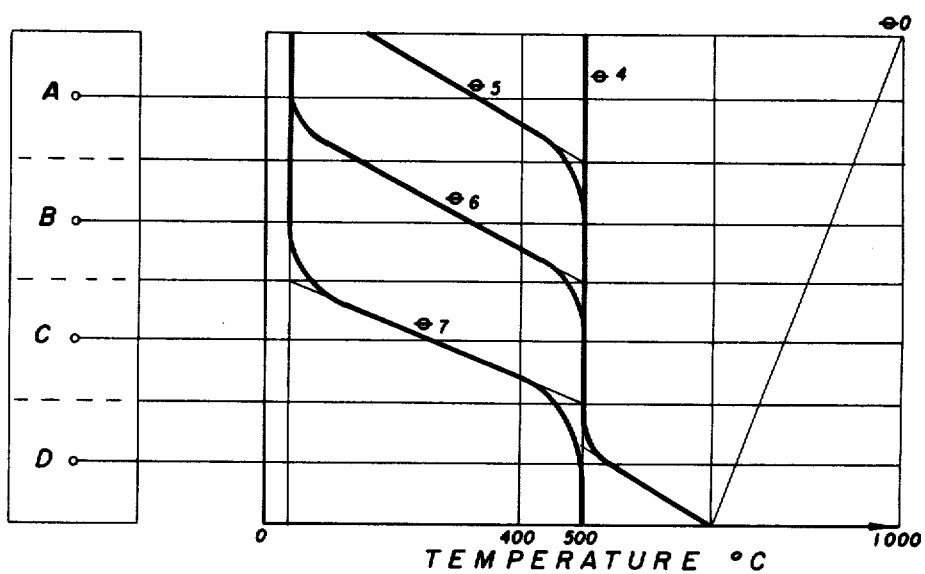
Figure 4:
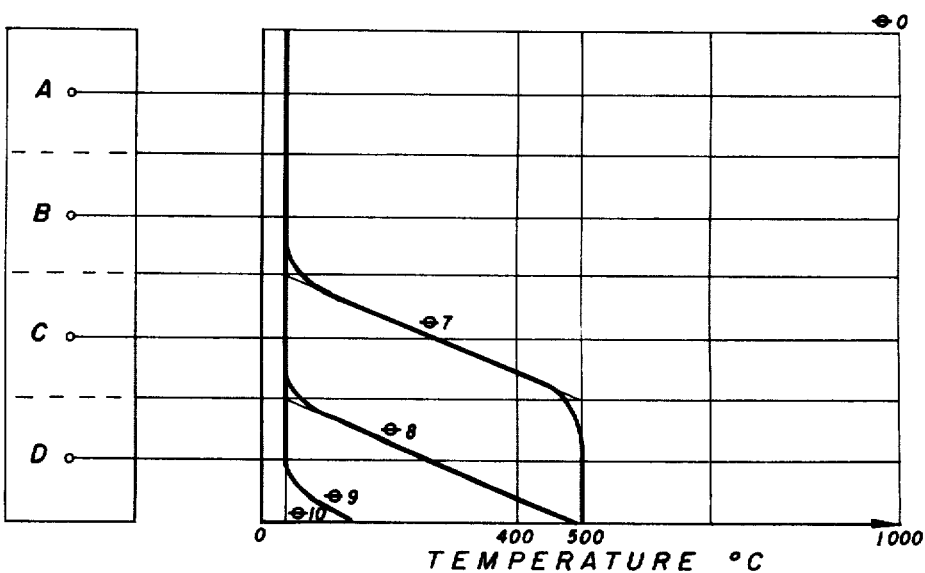

The process of the invention can best be understood and appreciated by reference to the accompanying drawings which illustrate apparatus capable of carrying out the process of the invention and wherein:

FIG. 1 is a diagrammatic representation of a gaseous reduction plant capable of producing sponge iron with the desired high carbon content;

FIG. 2 is a graph showing the relationship between metallization and carbon content for a reduction process such as that disclosed in U.S. Pat. No. 3,423,201;

FIG. 3 is a graph illustrating typical temperature profiles that might be expected at different levels of the sponge iron bed in the cooling reactor of a prior art system at different time intervals during the cooling cycle; and FIG. 4 comprises three graphs illustrating typical temperature profiles that might be expected in the cooling reactor bed when using the process of the present invention.

The objects and advantages of the present invention are achieved in general by carrying out the cooling and carburizing of the sponge iron in the cooling reactor in at least two steps using gases at two different temperatures. In the first step a gas at an intermediate temperature, i.e., a temperature between the cooling and reducing temperatures of the prior art process is passed through the bed of sponge iron in the reducing reactor. The intermediate temperature used will ordinarily be within the range 250° to 800° C., preferably 400° to 800° C., preferably 400° to 700° C. As will be pointed out more fully below, by using a gas at a somewhat elevated temperature in the first step of the cooling cycle, the sponge iron remains for a longer period of time at a temperature at which carburization occurs and thus a larger amount of carbon transfer occurs than is obtained in prior processes using ambient temperature cooling gas throughout the cooling cycle. Also since gaseous reduction of the iron oxide can occur at temperatures as low as say 550° C., the relatively high temperature of the first cooling step of the present process increases to some extent the reduction of the iron oxide that occurs in the cooling reactor.

After the desired amount of carburization has occurred, the elevated temperature cooling gas is replaced by the usual low temperature cooling gas which is passed through the sponge iron bed during the second and any subsequent steps of the cooling cycle. As further pointed out below, it may be desirable to use a cooling procedure of three or more steps comprising an elevated temperature step and two or more ambient temperature steps. Also in the second and subsequent steps, and possibly also in the first step, cooling and recycling of the cooling gas may be desirable. In such cases it is often advantageous to use a relatively low recycle ratio in the first low temperature cooling step when a portion of the bed may still be at a carburizing temperature, and a relatively high recycle ratio in the second or subsequent low temperature cooling step to effect rapid cooling of the sponge iron near the end of the cooling cycle. Alternatively, a single low temperature cooling step can be used with a continuously increasingly gas recycle ratio so that the cooling rate increases progressively as a function of time.

The nature of the present invention can be further explained and clarified by reference to FIGS. 2 to 4 of the drawings. From a consideration of equation (9) above, it is evident that for a given desired value of potential metallization ($p_m$) of the sponge iron produced in the reduction plant, the carbon content of the sponge iron must vary inversely as its metallization. In particular, as the metallization of the sponge iron produced decreases, its carbon content must increase correspondingly to achieve a given potential metallization and thereby take advantage of the economies noted above. However, as shown in FIG. 2, when the carburizing techniques of the prior art are used, the carbon content of the sponge iron varies directly as the metallization rather than inversely in respect thereto. More particularly, FIG. 2 is a plot of percent carbon against percent metallization for a cooling and carburizing process of the type disclosed in U.S. Pat. No. 3,423,201. While this patent discloses a two-step cooling process with cooling and recycle of the cooling gas, it does not disclose the relatively high temperature initial cooling step of the present process. The data of FIG. 2 show that using this prior art process a maximum of about 2.4% carbon is achieved at a 90% metallization and that at lower metallizations a lower carbon content, rather than the desired higher carbon content, is attained.

FIG. 3 illustrates the probable temperature profiles at spaced intervals during the cooling cycle using the prior art cooling process. In FIG. 3 A, B, C and D represent four horizontal layers into which the bed is arbitrarily divided. Downflow of cooling gas through the bed is assumed. The cooling cycle is divided into ten intervals and curves are plotted for the temperature profile at the beginning of each interval, the curves being designated as $\theta_0$ to $\theta_9$, respectively.

As shown in FIG. 3, the initial temperature varies substantially linearly from about 1,000° C. at the top of the bed to about 700° C. at the bottom of the bed. This temperature profile is approximately the same as that of the bed at the end of the second reduction stage.

At time $b_2$ the top of the bed has been cooled very nearly to the temperature of the entering cooling gas. At time $\theta_5$, which is the mid-point of the cooling cycle, more than half of the bed has been cooled below 400° C., i.e., a temperature below which relatively little carburization occurs.

FIG. 4 illustrates a three-step embodiment of the cooling process of the present invention. As in the case of FIG. 3, the probable temperature profiles are illustrated for ten time intervals. In the upper chart 4A the profile curves are based on the assumption that the gas has a temperature of 500° C. and flows downwardly through the bed. In the second and third steps illustrated in charts 4B and 4C, the feed gas is assumed to be at an ambient temperature, e.g., 25° to 30° C.

As illustrated in FIG. 4, the initial profile at time $\theta_0$ is the same as in FIG. 3, i.e., the temperature varies from 1,000° C. at the top of the bed to 700° C. at the bottom of the bed. At time $\theta_1$ the temperature at the top of the bed has dropped to a little below 700° C. but is still well above the top bed temperature at time $\theta_1$ in FIG. 3. At time $\theta_5$, i.e., at the mid-point of the cooling cycle, nearly all of the bed is above 400° C., i.e., above the temperature at which carburization occurs, in contrast to the situation illustrated in FIG. 3 where almost half of the bed is below the carburizing temperature at the mid-point of the cooling cycle. Chart 4C shows that between time $\theta_7$ and time $\theta_9$ very rapid cooling of the bed occurs. Thus a comparison of FIGS. 3 and 4 shows that by using the high temperature cooling step of the present process the bed can be maintained within the carburizing temperature range for a substantially greater proportion of the cooling cycle.

The length of time that the bed is cooled with the intermediate temperature gas will vary as a function of such factors as the desired metallization and potential metallization of the sponge iron and total length of the cooling cycle. Typically the first or high temperature cooling step will comprise about one-third of the cooling period. If relatively short cooling and reduction cycles are used to produce a sponge iron product of low metallization, carburization should be carried out during a higher proportion of the cooling cycle in order to obtain a sufficient transfer of carbon to the sponge iron to achieve an acceptable potential metallization.

As pointed out above, the effluent gas from the cooling reactor can be cooled and recycled during one or more of the cooling steps of the present process. In general such recycling increases the mass flow rate of gas passing through the bed and accelerates the cooling process. It is especially advantageous in the latter part of the cooling cycle when the bed temperature has dropped below the temperature at which significant carburization occurs. In a typical three-step embodiment of the present process the volumetric ratio of recycled gas to fresh cooling gas may be 0 to 0.5 in the first step, 0.3 to 1.5 in the second step and 0.8 to 3.0 in the third cooling step.

Referring now to FIG. 1 which illustrates apparatus capable of carrying out the method of the invention, the gaseous reduction system there shown comprises a cooling reactor 10, primary reduction reactor 12, secondary reduction reactor 14, and charging reactor 16. Reducing gas for cooling, carburizing and reducing the ferrous material in the several reactors of the system is generated by catalytic conversion of natural gas and steam into carbon monoxide and hydrogen in a reformer generally designated 18. Natural gas or other suitable hydrocarbon is supplied through pipe 20, flows through a preheating coil in the stack 22 of reformer 18, thence through an external pipe 24, a second preheating coil in the stack 22 and external pipe 26 to the body of the reformer. Steam from a pipe 28 is supplied to the pipe 24 and mixes with the hydrocarbon gas therein. The resulting mixture of steam and hydrocarbon gas flows through pipe 26 and thence through catalyst tubes in the reformer 18 wherein it is heated to an elevated temperature and converted to the desired reducing gas.

Effluent gas from reformer 18 flows through pipe 30 to a quench cooler 32 which cools the gas to remove water therefrom. The cooled gas leaves cooler 32 through pipe 34 containing a back pressure controller 36 and flows successively through the cooling reactor 10, primary reduction reactor 12 and secondary reduction reactor 14. During the portion of the operation here being described the reactor 16 is disconnected from the system so that product sponge iron can be removed therefrom and the reactor charged with fresh ore.

The reducing gas in pipe 34 initially flows either through branch pipe 38 containing valve 40 or branch pipe 42 containing valves 44 and 45. At the beginning of an operating cycle, the valve 44 is closed and the valve 40 is opened to cause the reducing gas to flow to and through a heater 46 wherein the gas is heated to an elevated temperature of say, e.g., 400° to 700° C. From the heater 46 the gas flows through pipe 48 to a combustion chamber 50 communicating with the interior of cooling reactor 10. The function of the combustion chamber will be described below in connection with the operation of reducing reactors 12 and 14. When a reactor of the system is functioning as a cooling reactor, such as the cooling reactor 10, the combustion chamber 50 acts merely as a conduit for the entering cooling gas.

Within the reactor 10 the reducing gas, which has been heated to an elevated temperature, flows downwardly through the bed of sponge iron therein and thence out of the reactor 10 through pipe 52 to the cooler 54 wherein it is cooled and dewatered. Within the reactor 10 the reducing gas at the elevated temperature cools the sponge iron as described above to a temperature within the carburizing range to cause carbon to be transferred from the gas to the sponge iron. From cooler 54 the gas flows through pipe 56 to the reduction reactors 12 and 14 as described below.

At the end of the first cooling step or cooling period, valve 40 is closed and valve 44 opened to cause the cooled reducing gas to flow through pipe 42 to the top of cooling reactor 10, and thence downwardly through the sponge iron bed therein. The cooling gas cools the bed of sponge iron in the manner described above in connection with FIG. 4. After flowing through the sponge iron bed in cooling reactor 10 the gas passes through pipe 52 and cooler 54 to pipe 56 and thence on to the reducing reactors 12 and 14.

During the second cooling step or cooling period, it is usually desirable to recycle a portion of the cooling gas. To this end gas is withdrawn from pipe 56 through pipe 58 by pump 60 and pumped through pipe 62 to pipe 42 wherein it is mixed with the fresh cooled gas from the reformer and supplied to the cooling reactor 10. In order to provide a regulatable flow of recycled gas while operating pump 60 at a constant speed, discharge pipe 62 is connected to inlet pipe 58 by a return flow pipe 64 containing a back pressure controller 66. By adjusting the set point of the controller 66 the amount of gas flowing through return flow pipe 64 and hence the net amount of recycled gas can be readily controlled. In cases where three cooling steps or periods are used comprising a heated gas cooling period and two cooled gas cooling periods, it is usually desirable that gas be recycled at a relatively low ratio during the second time period and at a relatively high ratio during the third time period. As indicated above, the volumetric ratio of recycled cooling gas to fresh reducing gas from the reformer during the second time period may, for example, vary from 0.3 to 1.5 and during the third time period may vary from 0.8 to 3.0. Also, if desired, some of the gas can be recycled during the first cooling step.

Gas leaving the cooling reactor circuit through pipe 56 flow successively through the primary reduction reactor 12 and secondary reduction reactor 14. Reactor 12 contains ferrous material that has been partially reduced in a previous cycle. Reactor 14 contains fresh ore, and the initial reduction of the ore occurs in this reactor. More particularly, gas from pipe 56 flows to and through a heater 68 wherein it is heated to a temperature of say 750° to 950° C., thence through a pipe 70 to combustion chamber 72, similar to the combustion chamber 50, associated with reactor 10. If desired, a superheater 71 may be interposed in pipe 70 to effect a part of the heating of the reducing gas.

Within the combustion chamber 72 the reducing gas is mixed with a minor amount of air and partially burned to raise the temperature of the mixture to say 950° to 1100° C. The air that is mixed with the reducing gas is preheated in a heater 74 and flows through pipe 76 and branch pipe 78 containing valve 80 to combustion chamber 72. Heated air is also supplied through a branch pipe 82 containing valve 84 to the combustion chamber 50 of reactor 10 and through a branch pipe 86 containing a valve 88 to the combustion chamber 90 of reactor 14. During the portion of the reduction process here being described, valve 84 is closed and valves 80 and 88 are open.

The hot reducing gas flows from combustion chamber 72 to the interior of reactor 12 and thence downwardly through the bed of ferrous material therein to further reduce it. Effluent gas from reactor 12 flows through pipe 92, cooler 94 and pipe 96 to heater 98 wherein it is again heated to a temperature of the order of 750° to 950° C. The heated reducing gas flows through pipe 100 to combustion chamber 90 wherein it is mixed with a small amount of air and thereby partially burned to increase the temperature of the mixture. The hot gas enters reactor 14 and flows downwardly through the body of ferrous material therein to partially reduce it.

Effluent spent reducing gas from the secondary reactor 14 flows through pipe 102 and cooler 104 to a spent reducing gas header 106. The spent gas still has value as a fuel gas and may be used as illustrated in the drawing to supply heat to the heaters 46, 68, 74 and 98 and to the reformer 18. An excess gas not required for these purposes may be sent to a suitable point of storage.

The reactor 16 is provided with a heater 108 similar to the heaters 46, 68 and 98 and a combustion chamber 110 similar to the combustion chambers 50, 72 and 90 of reactors 10, 12 and 14, respectively. However, since the reactor 16 is discharged and charged during the portion of the reduction process here being described, the heater 108 and combustion chamber 110 are inoperative during this portion of the reduction process.

From the foregoing description it should be apparent that the present invention provides a method capable of achieving the several objects of the invention outlined above. By using a heated gas in the initial cooling step of the sponge iron cooling cycle, the sponge iron is held for a relatively long period of time at a temperature within the carburizing range, thus providing an exceptionally high transfer of the carbon from the cooling gas to the sponge iron. Using the present method a sponge iron can be produced having an iron carbide content corresponding to say 2.5 to 6% by weight of carbon, preferably 3 to 5%. The numerous advantages of producing such a sponge iron and using it in a steel-making furnace have been pointed out above. A typical sponge iron produced by the present process may have the following composition:

| | |
|---|---|
| Iron oxide, FeO | 25.7 |
| Iron carbide Fe₃C | 57.1 |
| Metallic iron, Fe | 9.9 |
| Free carbon | .2 |
| Gangue | 7.1 |
| | 100.0 |
| Metallization | 76% |
| Potential metallization | 96% |
| Total Carbon | 4.0% |

Such a high carbon transfer from the reducing gas to the sponge iron permits the production of sponge iron having a low metallization combined with a relatively high potential metallization. This combination of low metallization, i.e., a metallization of 60 to 85%, in combination with a high potential metallization of 85 to 100% is necessary in order to maximize the overall economies that can be obtained by carrying out a substantial part of the reduction in an electric furnace or other suitable type of steel-making furnace.

It is, of course, to be understood that the foregoing description is intended to be illustrative only and that numerous changes can be made in the procedures and apparatus described without departing from the spirit of the invention as set forth in the appended claims.

We claim:

1. In a process for the batchwise reduction of a metal oxide to sponge metal by contact with a hot reducing gas in a multiple unit reactor system of the type in which separate fixed beds of metal-bearing material are simultaneously treated in a plurality of reactors including at least one cooling reactor and at least one reduction reactor and a cool carbon-containing reducing gas is passed through a cooling reactor of said system, heated to a temperature of 950° to 1100° C. and then passed through a reduction reactor of said system, the method of cooling and carburizing a bed of metal-bearing material in said cooling reactor which comprises pre-heating a stream of said cool reducing gas to a temperature of 250° to 800° C. before it comes in contact with said metal bearing material, passing said preheated stream of reducing gas through said bed of metal-bearing material in said cooling reactor for a first period of time to carburize the metal thereof and reduce metal oxide present therein and thereafter passing a stream of said cool but not pre-heated reducing gas through said bed of metal-bearing material in said cooling reactor for a second period of time to complete the cooling of said material.

2. A process according to claim 1 wherein said reducing gas is generated by catalytically reforming a mixture of steam and hydrocarbon.

3. A process according to claim 1 wherein said stream of reducing gas is heated to a temperature of 400° to 700° C. before being passed through said bed of metal-bearing material in said cooling reactor.

4. A process according to claim 1 wherein during said first time period a portion of the effluent cooling gas from said bed of metal-bearing material is cooled and recycled through said bed.

5. A process according to claim 1 wherein during said second time period a portion of the reducing gas flowing through said bed of metal-bearing material is cooled and recycled to said bed.

6. A method according to claim 5 wherein the volumetric proportion of recycled gas is progressively increased during said second time period.

7. In a process for the batchwise reduction of metal oxide to sponge metal by contact with a hot reducing gas in a multiple unit reactor system of the type in which separate fixed beds of metal-bearing material are simultaneously treated in a plurality of reactors including at least one cooling reactor and at least one reduction and a cool carbon-containing reducing gas is passed through a cooling reactor of said system, heated to a temperature of 950° to 1100° C. and then passed through a reduction reactor of said system, the method of cooling and carburizing the bed of metal-bearing material in said cooling reactor which comprises preheating a stream of said cool reducing gas to a temperature of 250° to 800° C. before it comes in contact with said metal bearing material, passing said preheated stream of reducing gas through the bed of metal-bearing material in said cooling reactor for a first period of time to carburize the metal thereof and reduce metal oxide present therein, then passing a stream of said cool but not pre-heated reducing gas through said bed of metal-bearing material for a second period of time to further cool said material, cooling and recirculating a relatively small proportion of the gas passing through said bed during said second time period, thereafter during a third time period passing a stream of said cooled reducing gas through said bed of metal-bearing material and cooling and recycling a relatively large proportion of the gas passing through said bed during said third period to rapidly complete the cooling of said material.

8. A process according to claim 7 and in which said metal oxide is iron ore and said sponge metal is sponge iron.

9. A method according to claim 8 wherein said reducing gas is generated by catalytically reforming a mixture of steam and hydrocarbon.

10. A process according to claim 8 wherein during said second time period the volumetric ratio of recycled cooling gas to fresh reducing gas from said reformer is from 0.3 to 1.5.

11. A process according to claim 8 wherein the volumetric ratio of recycled gas to fresh reducing gas from said reformer during said third time period is from 0.8 to 3.0.

* * * * *